(12) United States Patent
Mathews et al.

(10) Patent No.: US 7,070,015 B2
(45) Date of Patent: Jul. 4, 2006

(54) BATTERY MOUNTING SYSTEM FOR AUTOMOTIVE VEHICLE

(75) Inventors: Jacob Mathews, Canton, MI (US); Alison Japikse Carothers, Plymouth, MI (US); Patrick Maguire, Ann Arbor, MI (US); Leonard Anthony Shaner, New Baltimore, MI (US); Douglas Zhu, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 182 days.

(21) Appl. No.: 10/249,839

(22) Filed: May 12, 2003

(65) Prior Publication Data

US 2004/0226765 A1 Nov. 18, 2004

(51) Int. Cl.
*B60R 16/04* (2006.01)

(52) U.S. Cl. ................ 180/68.5; 180/274; 180/65.1

(58) Field of Classification Search ............. 180/274, 180/281, 286, 271, 65.1, 65.3, 68.5, 291, 180/232; 429/34, 99, 100
See application file for complete search history.

(56) References Cited

U.S. PATENT DOCUMENTS

| | | | |
|---|---|---|---|
| 4,058,182 A | | 11/1977 | Huber |
| 4,216,839 A | * | 8/1980 | Gould et al. ........... 180/65.1 |
| 4,339,015 A | * | 7/1982 | Fowkes et al. ......... 180/65.1 |
| 4,621,822 A | | 11/1986 | Knochelmann et al. |
| 5,193,635 A | * | 3/1993 | Mizuno et al. ......... 180/65.3 |
| 5,392,873 A | * | 2/1995 | Masuyama et al. ..... 180/68.5 |
| 5,501,289 A | * | 3/1996 | Nishikawa et al. ..... 180/68.5 |
| 5,555,950 A | | 9/1996 | Harada et al. |
| 5,585,205 A | * | 12/1996 | Kohchi ................... 429/99 |
| 5,947,223 A | * | 9/1999 | Rebmann ............... 180/232 |
| 6,158,538 A | | 12/2000 | Botzelmann |
| 6,227,322 B1 | * | 5/2001 | Nishikawa ............. 180/68.5 |
| 6,431,300 B1 | | 8/2002 | Iwase |
| 6,478,106 B1 | * | 11/2002 | Hawener et al. ....... 180/232 |
| 6,598,691 B1 | * | 7/2003 | Mita et al. ............. 180/65.1 |
| 6,648,090 B1 | * | 11/2003 | Iwase .................... 180/68.5 |
| 2002/0191385 A1 | * | 12/2002 | Miyazaki ............... 361/826 |
| 2003/0070858 A1 | * | 4/2003 | Kondo ................... 180/291 |
| 2003/0111971 A1 | * | 6/2003 | Ishikawa et al. ....... 318/139 |

FOREIGN PATENT DOCUMENTS

| | | | | |
|---|---|---|---|---|
| DE | 4331900 A1 | 3/1994 | | |
| JP | 08192639 | 7/1996 | | |
| JP | 8-192639 | * | 7/1996 | ............ 180/65.1 |
| JP | 2003-127907 A | * | 5/2003 | ............ 180/65.1 |

* cited by examiner

*Primary Examiner*—Jeffrey Restifo
(74) *Attorney, Agent, or Firm*—Gigette M. Bejin; Artz & Artz, P.C.

(57) ABSTRACT

An automotive vehicle has a battery mounting system including battery tray fastened to a floor within a compartment of the vehicle, and a motion convertor for repositioning battery tray as a result of a collision impact upon the compartment by causing the battery tray to rotate from a first position in which the battery tray is generally parallel to the floor to which it is mounted, to a second position which the battery tray is not parallel to the plane of the floor.

12 Claims, 4 Drawing Sheets

BATTERY MOUNTING SYSTEM FOR AUTOMOTIVE VEHICLE

BACKGROUND OF INVENTION

1. Field of the Invention

The present invention relates to a system and method for mounting a traction battery within an automotive vehicle.

2. Disclosure Information

Certain automotive vehicles such as electric vehicles (EVs), hybrid electric vehicles (HEVs), and fuel cell vehicles (FCVs), utilize sizable traction batteries, which dwarf conventional 12-volt automotive starting batteries in terms of both size and weight. Traction batteries utilize heavier components and greater volumes of electrolytes which require care to avoid spillage in the event of a collision of a vehicle equipped with such a battery. More precisely, the U.S. National Highway Traffic Safety Administration (NHTSA) Federal Motor Vehicle Safety Standard (FMVSS) 305 mandates performance requirements regarding electrolyte spillage and retention of battery modules mounted in passenger vehicles in the event of a collision up to 48 KPH with a front fixed barrier or 40 KHP if impacted by a rear moving barrier. These requirements are stringent and place demands on vehicle designers seeking to package traction batteries in an efficient manner.

When a traction battery within a EV, HEV or FCV is mounted adjacent the seating area of the vehicle, the integrity of the battery and its mounting system must be maintained. Battery integrity may be preserved in the event of a collision impact having sufficient force and kinetic energy to crush at least part of the floor area to which the battery tray is mounted if the battery tray is moved out of the crush area or crush zone. The present invention accomplishes protection of the battery tray's integrity in a package-efficient manner by dynamically moving the tray out of the crush area at the rear of the vehicle at the time of an impact.

Although it is known to release or move traction batteries in response to an impact, as shown in U.S. Pat. No. 5,555,950 and Japanese Patent 6-48185, such schemes usually result in significant impact upon the battery itself. In contrast, a system and method according to the present invention achieves dynamic relocation of the battery, thereby mitigating the crushing force associated with deformation of the vehicle floor. This distinction is clearly evidenced with respect to the Japanese Patent, which describes a system for mounting battery cells in which the cells are allowed to swing longitudinally in an event of a collision. Unfortunately, this prior art systems will not protect the battery from crushing in the event of longitudinal compression of the vehicle; the system of Japanese Patent 6-48185 merely manages the kinetic energy contained in the batteries. Note that the battery cells of the Japanese Patent swing horizontally and do not at any time leave the plane in which they are originally installed. In contrast, the present inventive system actually rotates the battery to a different positional elevation within the compartment, wherein the battery is much less likely to be damaged by subsequent crushing of the vehicle's floor.

SUMMARY OF INVENTION

An automotive vehicle is equipped with a battery mounting system including a battery tray fastened to a floor within a compartment of the vehicle. The compartment has a longitudinal axis. A motion convertor repositions the battery tray in an event of a collision impact upon the compartment and subsequent axial deformation of the compartment floor. The motion convertor causes the battery tray to rotate from a first position in which the battery tray is generally parallel to the floor to a second position in which the battery tray is not parallel to the floor. Because the battery tray rotates away from the floor, collapse of the floor will not subject the tray to crushing impact.

It is anticipated that the battery tray will enclose a plurality of battery cells, with the motion convertor preferably enclosing a plurality of power distribution components. The motion convertor preferably comprises a first inclined plane fastened rigidly to the floor of the compartment in which the battery tray is mounted. The first inclined plane engages a second inclined plane comprising a portion of the battery tray such that axial deformation of the floor causes the first inclined plane to slidingly engage the second inclined plane, so as to thereby lift and initiate rotation of the battery tray in a direction away from the floor. It should be emphasized that axial deformation of the floor to minor extent will not cause the first inclined plane of the motion convertor to slidingly engage the second inclined plane formed on the battery tray because the floor must deform or crush beyond a predetermined extent prior to engagement of the inclined planes.

The battery tray preferably has a leading end in the normal direction of travel, and a trailing end, with the tray being rotatable about a rotational axis which is defined by the leading end. This rotational axis is perpendicular to the longitudinal axis of the vehicle compartment into which the battery is mounted. The vehicle itself has a leading end in the normal direction of travel and a trailing end opposite the leading end. The motion convertor is fastened to the floor at a position between the battery tray and the trailing end of the vehicle such that the motion convertor lifts the end of the battery tray which is adjacent to the trailing end of the vehicle.

The present battery mounting system further comprises a restraint member extending between the floor and the battery tray such that the restraint member resists rotation of the battery tray beyond a predetermined position. Once the motion convertor has repositioned the battery tray as a result of collision driven axial deformation of the floor, with the convertor slidingly wedging the battery, thereby lifting the trailing end of the battery tray from the floor, the tray will be free to rotate until the restraint member resists further rotation of the battery tray beyond the predetermined position. The restraint member, which may comprise a flexible member or a bulkhead or other type of member, prevents the battery tray from impacting within the passenger compartment of the vehicle.

According to another aspect of the present invention, a method for repositioning a battery tray within an automotive vehicle in response to axial deformation of the vehicle includes the steps of mounting the battery tray upon a floor of the vehicle, with the floor having an axis extending in the normal direction of travel of the vehicle, mounting a motion convertor to the floor at a position between the battery tray and an end of the floor subject to axial deformation as a result of a collision, and slidably engaging the battery with the motion convertor in response to axial deformation of the floor. These steps are followed by conversion of the sliding motion of the motion convertor into rotational motion of the battery tray away from the floor and finally, restraining the battery from further rotation once the battery's rotational position has reached a predetermined limitation.

It is an advantage of the present invention that the structural integrity of a traction battery may be maintained notwithstanding that the compartment within which the battery is mounted is subjected to axial deformation sufficient to cause crushing of the compartment floor under the battery tray by an amount sufficient to intrude upon the footprint of the space normally occupied by the battery tray.

It is a further advantage of the present method and system that a battery installed according to the present invention will be protected in an event of a frontal impact of the vehicle into a barrier.

Other advantages, as well as objects and features of the present invention, will become apparent to the reader of this specification.

DETAILED DESCRIPTION

Figure 1:
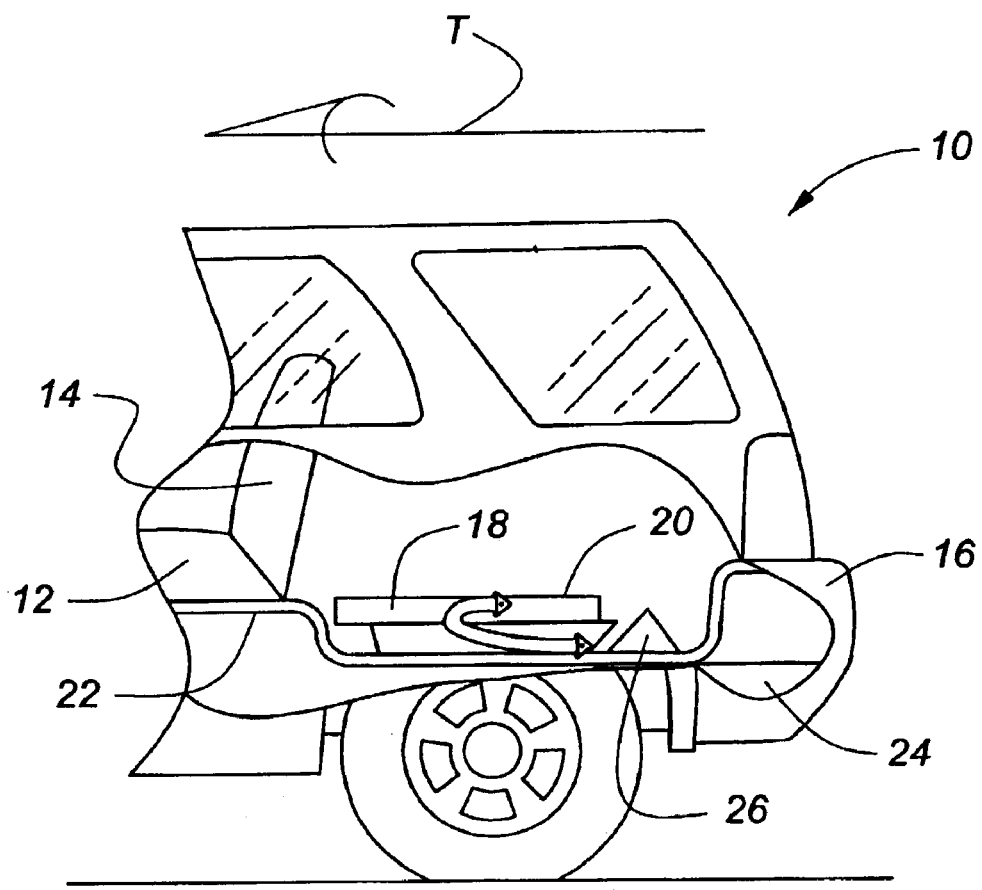
FIG. 1 is a schematic representation of an automotive vehicle having a battery mounting system according to the present invention.

As shown in FIG. 1 vehicle 10 has a normal direction of travel shown by arrow labeled T. Vehicle 10 has a rear seat with seat cushion 12 and seat back 14. A traction battery is housed behind rear seat 12, 14. The battery includes battery tray 18 having a cover 20, with battery tray 18 being mounted upon vehicle floor 22. In a preferred embodiment, battery tray 18, as well as a motion convertor, 26, are mounted within a recessed area formed in floor 22. Those skilled in the art will appreciate in view of this disclosure that a battery mounting system and method according to the present invention could be employed with a battery compartment having a flat or flush floor, as well as a vehicle having the illustrated recessed floor.

As further shown in FIG. 1, motion convertor 26 is mounted within a crush area 24 at the rear of vehicle 10. Crush area 24 generally extends laterally across the track width of the vehicle and axially from rear bumper 16 to the vicinity of rear seat 12, 14.

Figure 2:
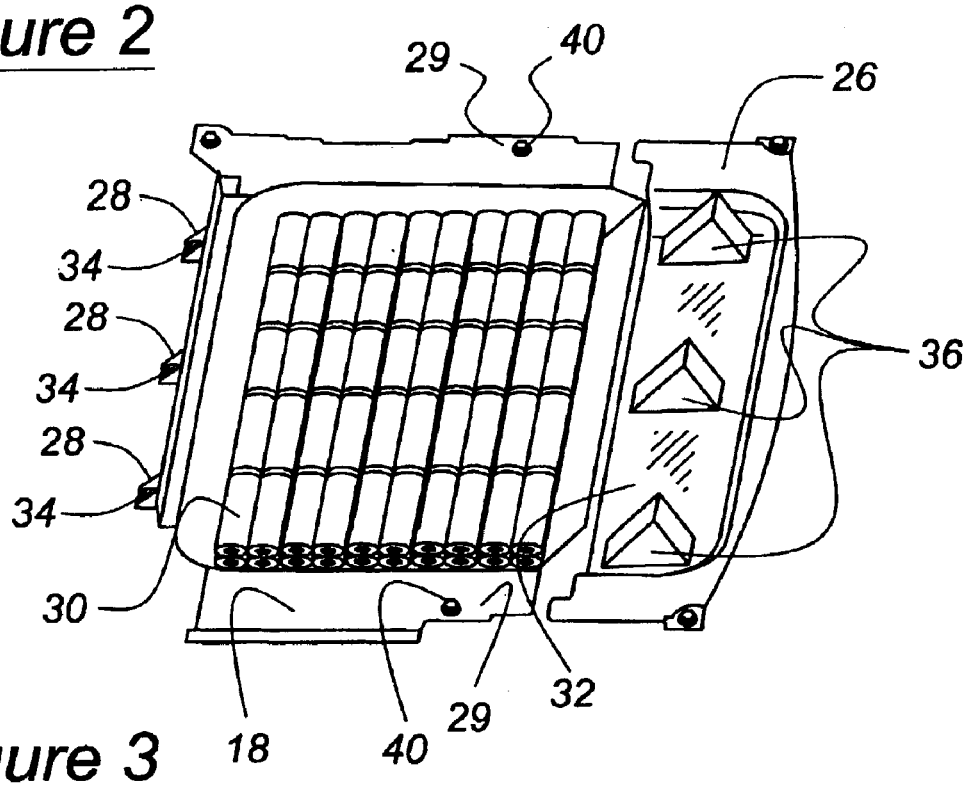
FIG. 2 is a perspective view of a battery tray and motion convertor according to one aspect of the present invention.

FIG. 2 illustrates further detail of battery tray 18, which has a plurality of cells 30 housed therein. Battery tray 18 is preferably constructed of high strength material such as steel, but could comprise of other materials such as metals, non-metals, composites and yet other materials known to those skilled in the art and suggested by this disclosure. Battery tray 18 is mounted to floor 22 by means of a plurality of fasteners 34 driven through tabs 28 located at the leading end, which is in the direction of forward travel of the vehicle. Battery tray 18 is also located by means of a plurality of fasteners 40 driven through tabs 29 which lie approximately mid-way between the leading end of battery tray 18, as marked by tabs 28, and the trailing end of battery tray 18, which lies adjacent motion convertor 26. It is noted that both battery tray 18 and motion convertor 26 are configured so as to allow components 18 and 26 to extend below the upper level of floor 22. This design aspect promotes convenient of packaging of the battery assembly. Nevertheless, as noted above, battery tray 18 and motion convertor 26 could be mounted on a flush deck within a compartment of the vehicle.

Fasteners 34 are intended to maintain the leading end of battery tray 18 in contact with floor 22 during a crash event. However, fasteners 40 are intended to shear and separate in response to load imposed upon battery tray 18 by motion convertor 26 during axial deformation of floor 22 resulting from a collision. The separation of fasteners 40 is important to allow rotation of battery tray 18 about an axis defined by three tabs 28.

Motion convertor 26 is shown in FIG. 2 as having a plurality of inclined planes 36 formed therein. The spaces extending between the inclined planes may house a plurality of electronic modules (not shown) associated with the power distribution function of the battery system.

Figure 5:
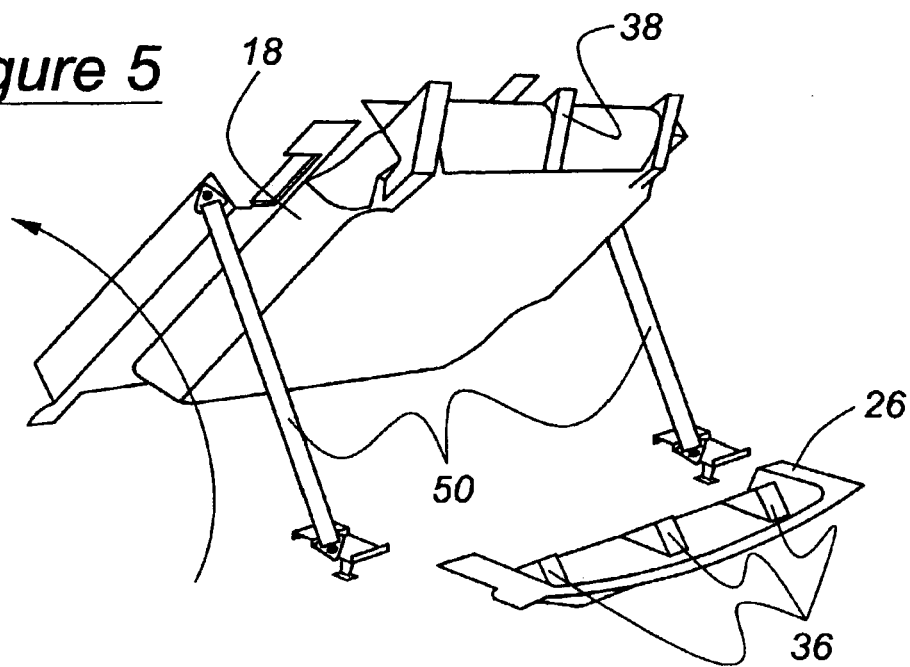
FIG. 5 illustrates a battery tray according to present invention rotated to a maximum extent such that a battery tray flexible restraint member is in tension.

As shown in FIG. 5, battery tray 18 has an inclined plane 38 at the trailing end thereof, which interacts with inclined planes 36 carried upon motion convertor 26 to provide rotational motion to battery tray 18. Although a plurality of inclined planes 36 is shown, those skilled in the art will appreciate in view of this disclosure that a single inclined plane could be incorporated in motion convertor 26.

Figure 3:
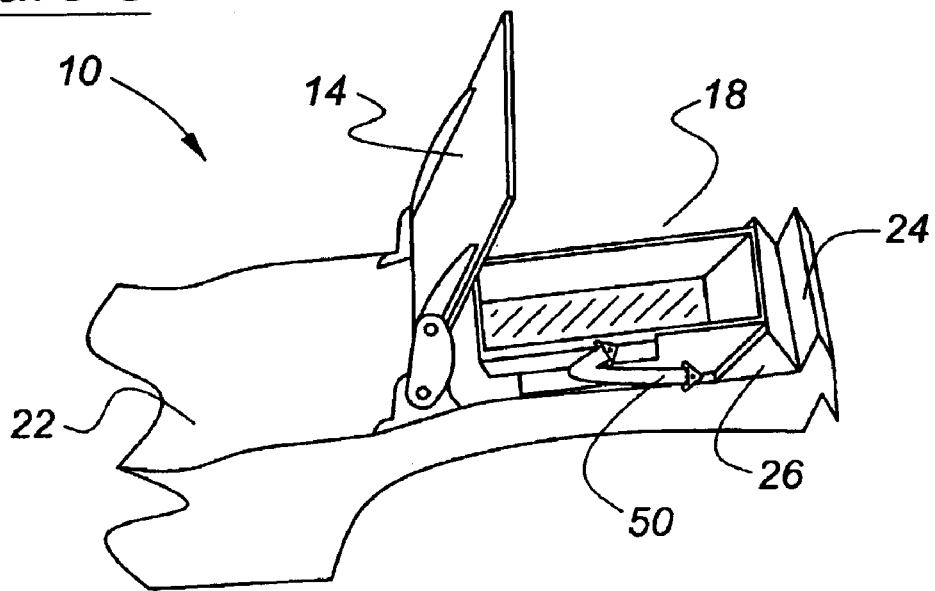
FIG. 3 is a view illustrating a partially crushed rear compartment of a vehicle in which an inclined plane motion convertor has come into initial contact with a battery tray according to the present invention.

FIG. 3 illustrates a point in a crash sequence at which an impact upon the rear of vehicle 10 has caused sufficient crush of zone 24 of floor 22 such that first inclined plane 36 formed in motion convertor 26 has moved into wedging contact with second inclined plane 38 which is incorporated into battery tray 18. Once inclined planes 36 and 38 interact, battery tray 18 will be caused to rotate upwardly about the axis defined by tabs 28. Hence, motion convertor 26 converts the axial crush motion of floor 22 in the area of rear deck 24 into rotational motion of battery tray 18.

Figure 4:
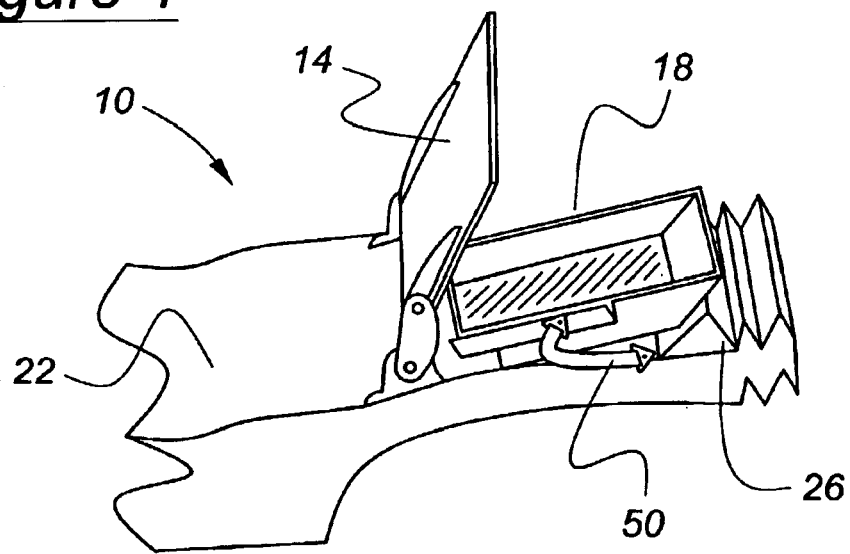
FIG. 4 illustrates a battery tray according to the present invention which is rotated free of cooperating inclined planes following axial deformation of the vehicle's floor structure beyond that illustrated in FIG. 3.

Once battery tray 18 rotates to the point illustrated in FIG. 4, inclined planes 36 and 38 will be almost to a point of disengagement, and further rotation of tray 18 will be snubbed by restraint 50, which preferably comprises a flexible inextensible member such as the fabric belting commonly used in vehicles for seat belt webbing. Those skilled in the art will appreciate, moreover, that other types of flexible restraints such as cables, whether metallic or non-metallic, or hinged links could accomplish the restraint task assigned herein to restraint strap 50. Moreover, those skilled in the art will appreciate in view of this disclosure that the restraint functionality could be accomplished by providing a bulkhead (not illustrated) across floor 22 in front of the leading end of battery tray 18 such that battery tray will abut the bulkhead when the point of maximum rotation of the battery tray 18 has been reached. Webbing 50 offers the additional benefit of having the capability to absorb energy, so as to safely slow the rotation of battery tray 18.

Figure 6:
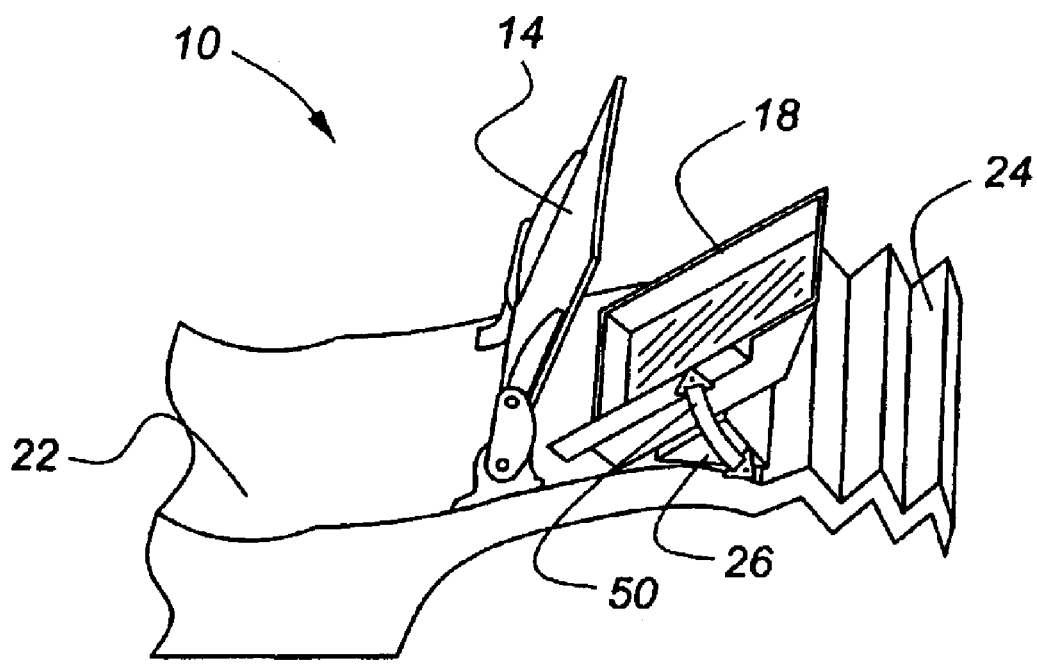
FIG. 6 illustrates a battery tray according to the present invention resting on a crushed area of a vehicle floor.

FIG. 6 shows battery tray 18 as resting upon a crushed area 24 of floor 22 once flexible restraint 50 has arrested the forward rotational movement of battery tray 18 and the tray has been allowed to settle back upon crushed area 24. FIG. 6 shows the matter in which the integrity of battery tray 18 is preserved notwithstanding that crush area 24 may intrude to a considerable extent upon the footprint occupied by battery tray 18 during normal operation of the vehicle.

Although the present invention has been described in connection with particular embodiments thereof, it is to be understood that various modifications, alterations, and adaptations may be made by those skilled in the art without departing from the spirit and scope of the invention. Those skilled in the art will appreciate in view of this disclosure that the precise rotation restraint system producing optimal results for any particular battery pack will be determinable by either iterative trials, or, where available, modeling. It is intended that the invention be limited only by the appended claims.

What is claimed is:

1. An automotive vehicle having a battery mounting system, comprising:

a battery tray fastened to a floor within a compartment of the vehicle, with the compartment having a longitudinal axis; and a motion convertor for repositioning said battery tray as a result of a collision impact upon the compartment and subsequent axial deformation of the compartment floor, with said motion convertor causing said battery tray to rotate from a first position in which the battery tray is generally parallel to the floor, to a second position in which the battery tray is not parallel to the floor, wherein said motion convertor comprises a first inclined plane fastened rigidly to said floor, with said first inclined plane engaging a second inclined plane comprising a portion of said battery tray such that axial deformation of said floor beyond a predetermined extent causes the first inclined plane to slidingly engage said second inclined plane, so as to thereby lift and initiate rotation of said battery tray in a direction away from said floor.

2. An automotive vehicle according to claim 1, wherein said battery tray encloses a plurality of battery cells.

3. An automotive vehicle according to claim 1, wherein said battery tray has a leading end and a trailing end, with said tray rotating about a rotational axis which is defined by said leading end, with said rotational axis being perpendicular to the longitudinal axis of said vehicle compartment.

4. An automotive vehicle according to claim 1, wherein said vehicle has a leading end in the normal direction of travel and a trailing end opposite said leading end, with said motion convertor being fastened to said floor at a position between said battery tray and the trailing end of the vehicle such that the motion convertor lifts the end of the battery tray which is adjacent to the trailing end of the vehicle.

5. An automotive vehicle according to claim 1, wherein said battery mounting system further comprises a flexible restraint member extending between said floor and said battery tray such that said restraint member resists rotation of said battery tray beyond a predetermined position.

6. An automotive vehicle having a battery mounting system, comprising:

a battery tray fastened to a floor within a compartment of the vehicle, with the compartment having a longitudinal axis, and with the battery tray having a leading end in the normal direction of travel of the automobile, and a trailing end opposite said leading end;

a motion convertor for repositioning said battery tray as a result of a collision driven axial deformation of the floor, with said deformation causing said motion convertor to slidingly wedge said battery tray, thereby lifting the trailing end of the battery tray from said floor and causing the battery tray to rotate about its leading end from a first position in which the battery tray is generally parallel to the floor to a second position in which the battery tray is not parallel to the floor; and a flexible restraint member extending between said floor and said battery tray such that said restraint member resists rotation of said battery tray beyond a predetermined position.

7. An automotive vehicle having a battery mounting system according to claim 6, wherein said motion convertor comprises a first inclined plane fastened rigidly to said floor, with said motion convertor engaging a second inclined plane comprising a portion of said battery tray.

8. An automotive vehicle having a battery mounting system according to claim 6, wherein said flexible restraint member absorbs the kinetic energy of rotation of said battery tray when said flexible restraint arrests the forward rotational motion of the battery tray.

9. A method for repositioning a battery tray within an automotive vehicle in response to axial deformation of the vehicle, comprising the steps of:

mounting the battery tray upon a floor of the vehicle, with the floor having an axis extending in the normal direction of travel of the vehicle;

mounting a motion convertor to said floor at a position between said battery tray and an end of the floor subject to axial deformation as a result of a collision;

slidably engaging the battery tray with the motion convertor in response to axial deformation of the floor; and converting the sliding motion of the motion convertor into rotational motion of the battery tray away from said floor, wherein the sliding motion of the motion convertor is converted to rotational motion of the battery tray by a wedge set comprising a first inclined plane incorporated in the motion convertor and fastened rigidly to said floor, and a second inclined plane comprising a portion of said battery tray such that deformation of said floor having a component along said axis causes the first inclined plane to slidingly engage said second inclined plane, so as to thereby lift and initiate rotation of said battery tray in a direction away from said floor.

10. A method according to claim 9, wherein said battery tray rotates about an axis defined by a leading end which is opposite the end of the battery tray engaged by the motion convertor.

11. A method according to claim 9, further comprising the step of providing a rotation restraint to resist rotation of the battery tray beyond a predetermined position.

12. A method according to claim 9, further comprising the step of providing a flexible rotation restraint member extending between said floor from a position adjacent the motion convertor to a location on the battery tray adjacent the end of the battery tray engaged by the motion convertor, such that the rotational kinetic energy of the battery tray is absorbed the flexible rotation restraint member.

* * * * *